United States Patent [19]

Tsuji et al.

[11] 4,230,398
[45] Oct. 28, 1980

[54] ZOOM LENS SYSTEM

[75] Inventors: Sadahiko Tsuji, Yokohama; Yasuhisa Sato, Kawasaki, both of Japan

[73] Assignee: Canon Kabushiki Kaisha, Tokyo, Japan

[21] Appl. No.: 925,860

[22] Filed: Jul. 18, 1978

[30] Foreign Application Priority Data

Jul. 26, 1977 [JP] Japan .................................. 52-89665

[51] Int. Cl.³ ............................................. G02B 15/18
[52] U.S. Cl. .................................................. 350/184
[58] Field of Search ................. 350/184, 186, 176, 212

[56] References Cited

U.S. PATENT DOCUMENTS 3,377,119  4/1968  Takano ................................. 350/184

FOREIGN PATENT DOCUMENTS 2551365  5/1976  Fed. Rep. of Germany ........... 350/184

*Primary Examiner*—Paul A. Sacher
*Attorney, Agent, or Firm*—Toren, McGeady and Stanger

[57] ABSTRACT

A zoom lens system having a range in the order of 1:9 with a relative aperture of 1:1.4, including a variable afocal front attachment and a basic objective which is designed to improve the Petzval sum with front and rear groups each consisting of three lens elements of positive, positive and negative powers in this order from the front by fulfilling the following relationships with its individual focal length Fr:

$$3Fr < Ff < 7Fr \quad (1)$$
$$\frac{0.5}{Fr} < \frac{1}{r4} - \frac{1}{r5} < \frac{1.2}{Fr} \quad (2)$$
$$0.05Fr < |r8| < 0.85Fr \quad (3)$$
$$\frac{0.15}{Fr} < \frac{1}{r10} - \frac{1}{r11} < \frac{0.6}{Fr} \quad (4)$$

wherein Ff is the focal length of the front group; r4 is the radius of curvature of the rear surface of the second positive lens in the front group; r5 is the radius of curvature of the front surface of the negative lens in the front group; r8 and r10 are the radii of curvature of the rear surfaces of the first and second positive lenses in the rear group respectively; and r11 is the radius of curvature of the front surface of the negative lens in the rear group.

2 Claims, 12 Drawing Figures

SPHERICAL ABERRATION

ASTIGMATISM CURVATURE
OF IMAGE FIELD

DISTORTION

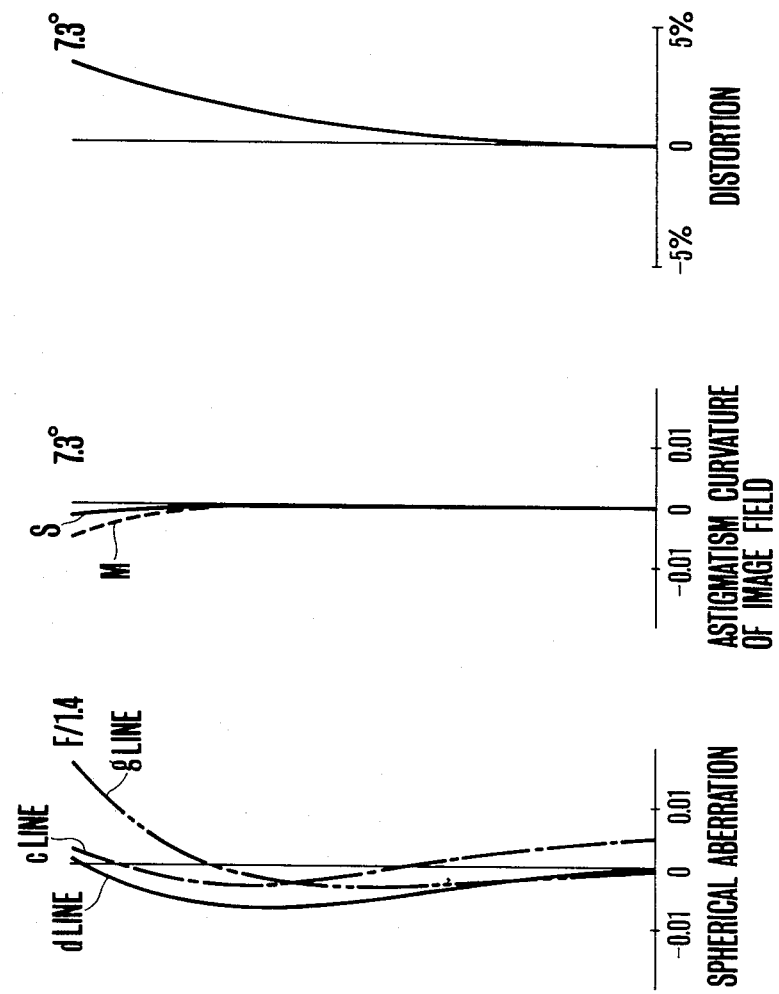

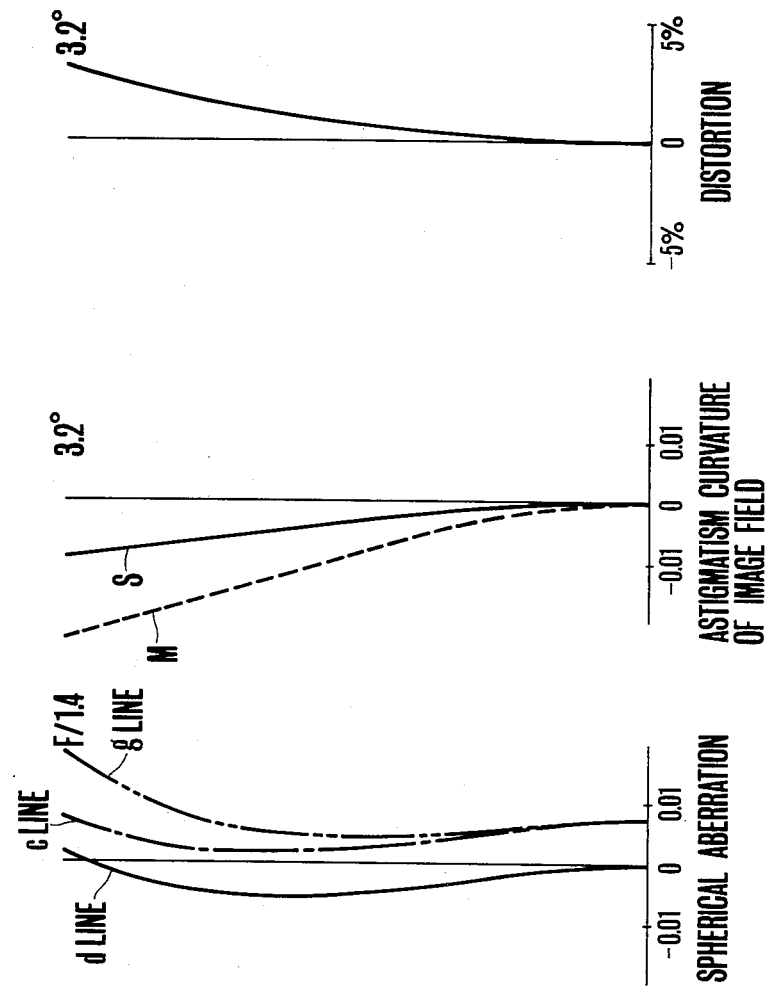

ZOOM LENS SYSTEM

BACKGROUND OF THE INVENTION

This invention relates to zoom lens systems, and more particularly to a multilens basic objective of fixed focal length which constitutes a zoom lens system together with a front variable afocal attachment and which is suited for improving the Petzval sum of the entire system.

The conventional zoom lens systems having high relative apertures and large zoom ratios generally make use of a Gauss type image forming rear lens section or basic objective to allow for many advantages in compensating for the various residual aberrations. The Gauss-type basic objective has, however, a tendency to produce a Petzval sum of negative sign. As the zoom ratio is increased, or the minimum focal length is relatively shorter, therefore, the Petzval sum of the entire system often changes to a negative number with a high possibility of inclination of the ideal image plane in a positive sense. An additional disadvantage is that the curvatures of the refracting surfaces must be correspondingly intensified, thereby making it more difficult to manufacture a production run of lens elements economically while holding the lens parameters to specific values.

One of the present inventors has proposed in Japanese Laid-Open Patent Application No. Sho 51-99037 (U.S. Patent Application Ser. No. 655,542) a zoom lens having a high relative aperture and a zoom ratio of about 1:3 which comprises a positive focusing lens, a negative variator, a positive compensator and a positive image forming lens.

SUMMARY OF THE INVENTION

An object of the present invention is to design a basic objective for combination with a front variable attachment of a large zoom ratio so as to contribute to a good state of correction of field curvature.

Another object of the invention is to provide a basic objective of simplified construction and to reduce the curvatures of the surfaces of lens elements constituting the basic objective for the purpose of economically manufacturing such lens elements.

Still another object is to permit an increase in relative aperture of a zoom lens system while nevertheless preserving a good state of correction of spherical aberration, astigmatism and distortion at a full open aperture.

The basic objective according to the present invention, preceded by a four-component front afocal attachment of which the first component is movable for focusing, the second and third are axially movable to effect zooming, and the fourth remains stationary during the focusing and zooming, is constructed with front and rear groups, each of which consists of positive first and second lenses and a negative third lens, the lenses being characterized by the following relationships:

$$3Fr < Ff < 7Fr \tag{1}$$
$$\frac{0.5}{Fr} < \frac{1}{r4} - \frac{1}{r5} < \frac{1.2}{Fr} \tag{2}$$
$$0.65Fr < |r8| < 0.85Fr \tag{3}$$
$$\frac{0.15}{Fr} < \frac{1}{r10} - \frac{1}{r11} < \frac{0.6}{Fr} \tag{4}$$

wherein Fr is the focal length of the basic objective; Ff is the focal length of the front group in the basic objective; r4 is the radius of curvature of the rear surface of the second positive lens in the first group; r5 is the radius of curvature of the front surface of the third negative lens in the front group; r8 is the radius of curvature of the rear surface of the first positive lens in the rear group; r10 is the radius of curvature of the rear surface of the second positive lens in the rear group; and r11 is the radius of curvature of the front surface of the negative lens in the rear group.

BRIEF DESCRIPTION OF THE DRAWINGS

FIGS. 5A to 5C are similar representations when in the intermediate focal length position.

FIGS. 6A to 6C are similar representations when in the maximum focal length position.

DESCRIPTION OF THE PREFERRED EMBODIMENTS

Figure 1:
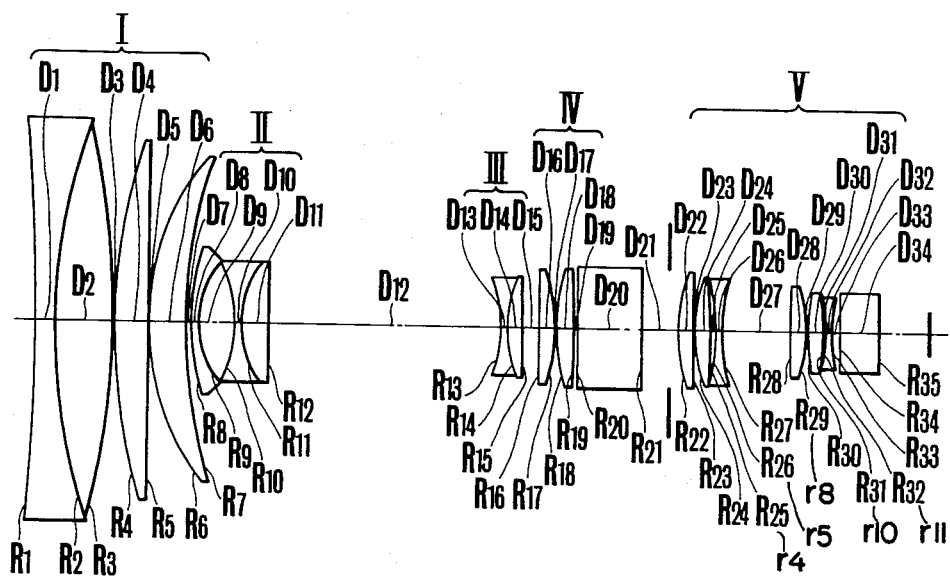
FIGS. 1, 2 and 3 are axial sectional views of three different examples of specific zoom lens systems according to the present invention with the components movable for zooming in the position of minimum focal length.
Figure 2:
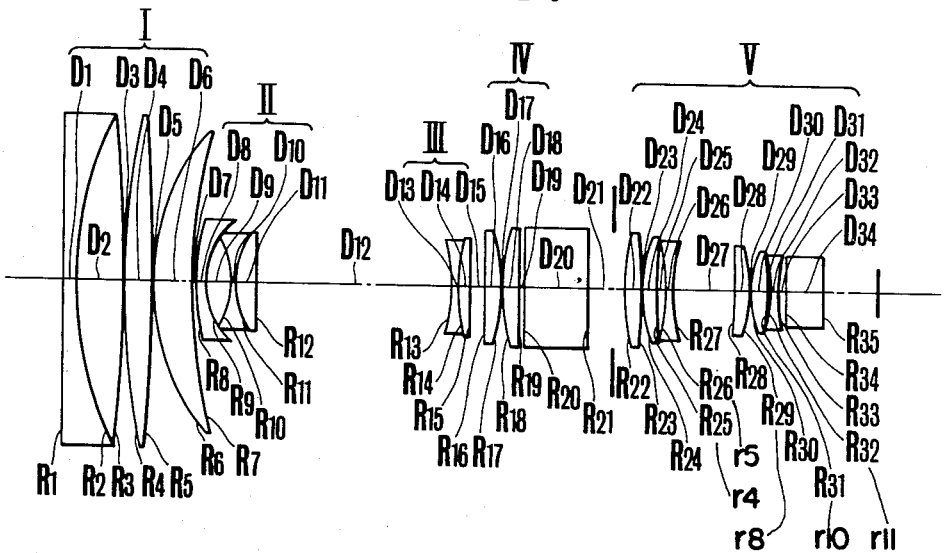
Figure 3:
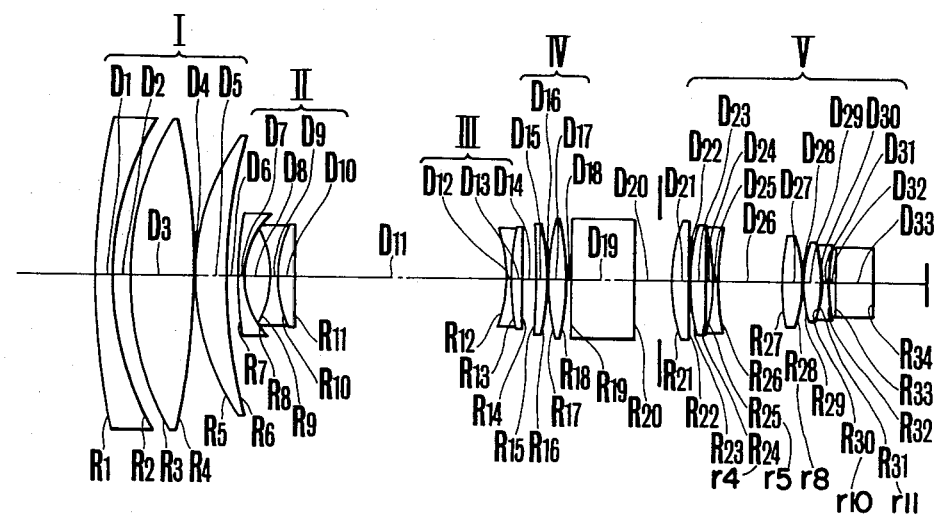
Figure 4A:
FIGS. 4A to 4C are graphic representations of the spherical aberration for three different spectral lines, astigmatism and distortion of the system of FIG. 1 when set in the minimum focal length position.
Figure 4B:
Figure 4C:
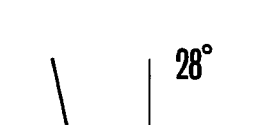

In FIGS. 1 to 3, there are shown zoom lens systems according to the present invention each of which comprises a front attachment consisting of four components, I, II, III and IV, and a basic objective V, with a diaphragm placed ahead of the objective V. Component I is of positive power and is axially movable for focusing purposes. Component II is of negative power and is axially movable to a large extent, causing the variation of focal length of the system. It consists of a negative meniscus singlet convex toward the front and a negative doublet composed of a bi-concave lens and a positive meniscus. Component III is of negative power and is axially movable to compensate for the image shift resulting from the axial movement of component II in such a manner as to maintain a fixed focal plane throughout the entire zooming range. It consists of a negative doublet composed of a bi-concave lens and a plano-convex (FIG. 1) or bi-convex (FIGS. 2 and 3) lens. Component IV is axially fixed and is of positive power. The light rays emanating from the third component III are collimated by this fourth component IV in passing therethrough. It consists of a bi-convex lens (FIGS. 1 and 2) or rearwardly convex positive meniscus (FIG. 3) and a bi-convex lens (FIGS. 1 and 3) or forwardly convex positive meniscus (FIG. 2).

The basic objective of focal length Fr as the image forming fifth component V of the system is focused at infinity and consists of a positive front group of a focal length Ff followed, after an air space, by a positive rear group. The front group consists of a bi-convex (nearly plano-convex in FIGS. 1 and 3) lens, a bi-convex lens (FIGS. 1 and 3) with the rear surface R25 or R24 respectively, or positive meniscus of forward convexity (FIG. 2) with the rear surface R25, and a bi-concave lens with the front surface R26 (FIGS. 1 and 2) or R25 (FIG. 2), these surfaces corresponding to r4 and r5 in the relationship (2) and defining an air space functioning as a diverging air lens. The rear group consists of a bi-convex lens (FIGS. 1 and 3) or positive meniscus of rearward convexity (FIG. 2), a bi-convex lens with the rear surface R31 (FIGS. 1 and 2) or R30 (FIG. 3) and a bi-concave lens with the front surface R32 (FIGS. 1 and 2) or R31 (FIG. 3), these surfaces corresponding to r10 and r11 in the relationship (4), and defining an air space functioning as a diverging air lens.

It will be seen from the above that the basic objective of the invention is simple in the construction and arrangement of constituent lens elements and takes a form of what is called Petzval type. In general, the Petzval type lens has two positive groups separated from each other by an air space to distribute the overall refractive power therebetween so that spherical aberration can be well corrected for axial light rays. Because of the production of a large Petzval sum, however, a large curvature of field is introduced to the system. Since the front attachment tends to contribute to a negative Petzval sum of the system itself, there are many examples of zoom lens systems employing the Petzval type in the basic objective. But in this case, the use of such a front attachment produces a problem that the imaging performance with extra-axial light rays tends to deteriorate as the angle of inclination of the extra-axial ray incident upon the basic objective is increased.

According to the present invention, this conventional problem is eliminated by imparting a relatively large focal length into the front group in the multilens basic objective as set forth in the relationship (1). When the upper limit of the inequality (1) is exceeded, the refractive power of the front group is weakened too much to result in an excessive concentration of refractive power on the rear group which in turn causes deterioration of spherical aberration. When the lower limit is exceeded, large extra-axial aberrations are produced, though the spherical aberration can be minimized.

Factor (2) represents the measurement of the diverging action of the air lens in the front group which is so important with respect to spherical aberration, for axial rays at large heights of incidence. When the upper limit of the inequality (2) is exceeded, the diverging action of the air lens becomes too strong to result in over-correction of spherical aberration. When the lower limit is exceeded, an under-correction of spherical aberration results.

Relationship (3) represents the rear surface curvature of the first lens in the rear group so as to produce higher-order aberrations of the widest open bundle of light rays which prevent spherical aberration from being rapidly over-corrected in a marginal zone, thereby the contrast characteristics at the full open aperture of the diaphragm are improved. When the upper limit of the inequality (3) is exceeded, the spherical aberration in the marginal zone is rapidly over-corrected. When the lower limit is exceeded, large higher-order spherical aberrations are produced, while rapid under-correction of spherical aberration in the marginal zone results.

Factor (4) represents the measurement of the diverging action of the air lens in the rear group which is so important for achieving good correction of off-axis aberrations and particularly astigmatism. When the upper and lower limits of the inequality (4) are exceeded, over- and under-corrections of astigmatism are caused by the increase and decrease in the diverging action respectively.

In summary, the present invention provides a multilens basic objective with front and rear groups provided with respective air lenses acting in a diverging manner to play respectively important parts in controlling spherical aberration and astigmatism. By making use of the relatively weak refractive power of the front group and the rear surface curvature (R28 and R29) of the first positive lens in the rear group in combination, the spherical aberration can be adjusted as desired to thereby produce a basic objective which is capable of good optical performance.

The numerical data of the zoom lens systems represented in FIGS. 1 to 3 are given in the following tables for the radii of curvature, R, and the axial thicknesses and separations between the successive surfaces, D, along with the indices of refraction for the spectral d line of sodium, N, and the Abbe numbers, V, of the various lens elements numbered successively from front to rear. The minus values of the radii, R, indicate surfaces concave toward incident light.

EXAMPLE 1

Focal length $F = -9.5964$ f-number: 1.4
Image angle: $2\omega = 56\text{-}6°$

| No. | R | D | F-Number : 1.4 | $2\omega = 56\text{-}6°$ |
|---|---|---|---|---|
| 1 | −66.963 | 0.508 | N1=1.80518 | V2 = 25.4 |
| 2 | 16.624 | 1.498 | N2=1.60311 | V2 = 60.7 |
| 3 | −18.561 | 0.022 | | |
| 4 | 14.884 | 0.842 | N3=1.60311 | V3 = 60.7 |
| 5 | ∞ | 0.22 | | |
| 6 | 6.400 | 0.951 | N4=1.60311 | V4 = 60.7 |
| 7 | 13.614 | variable | | |
| 8 | 8.425 | 0.194 | N5=1.71300 | V5 = 53.9 |
| 9 | 2.174 | 0.864 | | |
| 10 | −3.290 | 0.194 | N6=1.71300 | V6 = 53.9 |
| 11 | 2.490 | 0.674 | N7=1.80518 | V7 = 25.4 |
| 12 | 27.239 | variable | | |
| 13 | −3.265 | 0.149 | N8=1.76200 | V8 = 40.2 |
| 14 | 4.208 | 0.368 | N9=1.80518 | V9 = 25.4 |
| 15 | ∞ | variable | | |
| 16 | 25.963 | 0.446 | N10=1.60311 | V10 = 60.7 |
| 17 | −5.278 | 0.015 | | |
| 18 | 8.609 | 0.461 | N11=1.60311 | V11 = 60.7 |
| 19 | −13.978 | 0.104 | | |
| 20 | ∞ | 1.644 | N12=1.51633 | V12 = 64.1 |
| 21 | ∞ | 0.897 | | |
| 22 | 4.214 | 0.433 | N13=1.60311 | V13 = 60.7 |
| 23 | −179.694 | 0.022 | | |
| 24 | 5.228 | 0.403 | N14=1.60311 | V14 = 60.7 |
| 25 | −19.325 | 0.129 | | |
| 26 | −4.832 | 0.149 | N15=1.80518 | V15 = 25.4 |
| 27 | 9.035 | 1.734 | | |
| 28 | 11.345 | 0.448 | N16=1.64850 | V16 = 53.0 |
| 29 | −3.234 | 0.244 | | |
| 30 | 4.107 | 0.418 | N17=1.63636 | V17 = 35.4 |
| 31 | −6.759 | 0.060 | | |
| 32 | −3.549 | 0.149 | N18=1.80518 | V18 = 25.4 |
| 33 | 14.670 | 0.194 | | |
| 34 | ∞ | 1.016 | N19=1.63854 | V19 =]55.4 |
| 34 | ∞ | | | |
| 35 | ∞ | | | |

| Lens Separations during Zooming with Object at Infinity | | | |
|---|---|---|---|
| F | D7 | D12 | D15 |
| 1.0 | 0.143 | 6.026 | 0.399 |
| 4.186 | 4.347 | 1.422 | 0.800 |
| 9.596 | 5.599 | 0.642 | 0.327 |

The numerical values of the factors in the relationships
$Fr = 3.9784$
$Ff = 16.2208 = 4.0772 Fr$
$\dfrac{1}{r25} - \dfrac{1}{r26} = \dfrac{0.6174}{Fr}$
$r8 = 0.8130 Fr$
$\dfrac{1}{r31} - \dfrac{1}{r32} = \dfrac{0.5322}{Fr}$

EXAMPLE 2

Focal length F = 1.-9.5 f-number: 1.4
Image angle 2ω = 56-6°

| No. | R | D | | |
|---|---|---|---|---|
| 1 | ∞ | 0.298 | N1 = 1.80518 | V1 = 25.4 |
| 2 | 9.627 | 1.269 | N2 = 1.60311 | V2 = 61.0 |
| 3 | −29.796 | 0.022 | | |
| 4 | 21.705 | 0.671 | N3 = 1.69350 | V3 = 53.2 |
| 5 | −54.469 | 0.022 | | |
| 6 | 5.789 | 0.970 | N4 = 1.69350 | V4 = 53.2 |
| 7 | 15.918 | variable | | |
| 8 | 6.566 | 0.149 | N5 = 1.77250 | V5 = 49.6 |
| 9 | 1.806 | 0.671 | | |
| 10 | −2.673 | 0.149 | N6 = 1.71300 | V6 = 53.9 |
| 11 | 2.223 | 0.522 | N7 = 1.80518 | V7 = 25.4 |
| 12 | 31.550 | variable | | |
| 13 | −3.848 | 0.149 | N8 = 1.77250 | V8 = 49.6 |
| 14 | 10.203 | 0.298 | N9 = 1.80518 | V9 = 25.4 |
| 15 | −35.312 | variable | | |
| 16 | 32.839 | 0.148 | N10 = 1.60311 | V20 = 61.0 |
| 17 | −6.236 | 0.014 | | |
| 18 | 4.831 | 0.418 | N11 = 1.60311 | V11 = 61.0 |
| 19 | 272.264 | 0.149 | | |
| 20 | ∞ | 1.642 | N12 = 1.51633 | V11 = 64.1 |
| 21 | ∞ | 0.925 | | |
| 22 | 5.295 | 0.462 | N13 = 1.60311 | V13 = 61.0 |
| 23 | −12.181 | 0.022 | | |
| 24 | 4.013 | 0.418 | N14 = 1.60311 | V14 = 61.0 |
| 25 | 51.757 | 0.208 | | |
| 26 | −3.917 | 0.164 | N15 = 1.80518 | V15 = 25.4 |
| 27 | 8.885 | 1.578 | | |
| 28 | −19.065 | 0.447 | N16 = 1.71300 | V16 = 53.2 |
| 29 | −2.763 | 0.022 | | |
| 30 | 2.927 | 0.477 | N17 =0 1.63636 | V17 = 35.4 |
| 31 | −3.804 | 0.026 | | |
| 32 | −3.254 | 0.149 | N18 = 1.80518 | V18 = 25.4 |
| 33 | 7.613 | 0.194 | | |
| 34 | ∞ | 1.015 | N19 = 1.63854 | V19 = 55.4 |
| 35 | ∞ | | | |

| Lens Separations during Zooming with Object at Infinity | | | |
|---|---|---|---|
| F | D7 | D12 | D15 |
| 1.0 | 0.145 | 5.075 | 0.363 |
| 3.345 | 3.281 | 1.275 | 1.027 |
| 9.500 | 4.675 | 0.546 | 0.363 |

The numerical values of the factors in the relationships
$Fr = 3.8744$
$Ff = 24.6779 = 6.3695 Fr$
$$\frac{1}{r25} - \frac{1}{r25} = \frac{1.0637}{Fr}$$
$r8 = 0.7134 Fr$
$$\frac{1}{r31} - \frac{1}{r32} = \frac{0.2012}{Fr}$$

EXAMPLE 3

Focal length F = 1-7.6097 f-number: 1.4
Image angle 2ω = 50-7°

| No. | R | D | | |
|---|---|---|---|---|
| 1 | 14.306 | 0.364 | N1 = 1.80518 | V1 = 25.4 |
| 2 | 6.179 | 0.409 | | |
| 3 | 6.639 | 1.430 | N2 = 1.60311 | V2 = 60.7 |
| 4 | −15.984 | 0.013 | | |
| 5 | 5.119 | 0.680 | N3 = 1.60311 | V3 = 60.7 |
| 6 | 10.986 | variable | | |
| 7 | 6.339 | 0.130 | N4 = 1.74400 | V4 = 44.8 |
| 8 | 1.766 | 0.604 | | |
| 9 | −2.332 | 0.130 | N5 = 1.65844 | V5 = 50.9 |
| 10 | 2.332 | 0.429 | N6 = 1.80518 | V6 = 25.4 |
| 11 | −206.861 | variable | | |
| 12 | −2.838 | 0.117 | N7 = 1.69350 | V7 = 43.3 |
| 13 | 10.546 | 0.195 | N8 = 1.80518 | V8 = 25.4 |
| 14 | −79.901 | variable | | |
| 15 | −19.296 | 0.260 | N9 = 1.60311 | V9 = 60.7 |
| 16 | −4.609 | 0.013 | | |
| 17 | 6.787 | 0.364 | N10 = 1.60311 | V10 = 60.7 |
| 18 | −6.787 | 0.130 | | |

-continued

Focal length F = 1-7.6097 f-number: 1.4
Image angle 2ω = 50-7°

| No. | R | D | | |
|---|---|---|---|---|
| 19 | ∞ | 1.430 | N11 = 1.51633 | V11 = 64.1 |
| 20 | ∞ | 0.806 | | |
| 21 | 3.599 | 0.399 | N12 = 1.60311 | V12 = 60.7 |
| 22 | 349.688 | 0.024 | | |
| 23 | 4.403 | 0.411 | N13 = 1.60311 | V13 = 60.7 |
| 24 | −17.035 | 0.110 | | |
| 25 | −4.185 | 0.130 | N14 = 1.80518 | V14 = 25.4 |
| 26 | 7.739 | 1.434 | | |
| 27 | 9.492 | 0.444 | N15 = 1.64850 | V15 = 53.0 |
| 28 | −2.812 | 0.019 | | |
| 29 | 3.441 | 0.380 | N16 =0 1.63636 | V16 = 35.4 |
| 30 | −5.820 | 0.052 | | |
| 31 | −3.074 | 0.130 | N17 = 1.80518 | V17 = 25.4 |
| 32 | 11.022 | 0.087 | | |
| 33 | ∞ | 0.884 | N18 = 1.63854 | V18 = 55.4 |
| 34 | ∞ | | | |

| Lens Separations during Zooming with Object at Infinity | | | |
|---|---|---|---|
| F | D6 | D11 | D14 |
| 1.0 | 0.246 | 4.770 | 0.330 |
| 3.436 | 3.449 | 1.168 | 0.730 |
| 7.609 | 4.610 | 0.406 | 0.330 |

$Fr = 3.4548$
$Ff = 12.5949 = 3.6456 Fr$
$$\frac{1}{r24} - \frac{1}{r25} = \frac{0.6227}{Fr}$$
$r28 = 0.8141 Fr$
$$\frac{1}{r30} - \frac{1}{r31} = \frac{0.5301}{Fr}$$

What is claimed is:

1. A zoom lens comprising:
   a focusing lens having a positive refractive power, movable for focusing purposes, and stationary during zooming;
   a variator having a negative refractive power, movable for variation, and arranged on the image side of said focusing lens;
   a compensator having a negative refractive power, movable simultaneously with said variator, and arranged on the image side of said variator;
   a converter for substantially collimating a beam of rays emanating from said compensator; and
   a basic lens for image forming purposes having a front sub-group and a rear sub-group each of which consists of two positive lenses and a negative lens in this order, satisfying the following relationships:

$$3Fr < Ff < 7Fr$$
$$\frac{0.5}{Fr} < \frac{1}{r4} - \frac{1}{r5} < \frac{1.2}{Fr}$$
$0.65 Fr < |r8| < 0.85 Fr$, said $r8$ having a negative value;
$$\frac{0.15}{Fr} < \frac{1}{r10} - \frac{1}{r11} < \frac{0.6}{Fr}$$

where Fr is the focal length of the basic lens; Ff is the focal length of said front sub-group; r4 is the radius of curvature of the rear surface of the second positive lens in said front sub-group; r5 is the radius of curvature of the front surface of the negative lens in said front sub-group; r8 is the radius of curvature of the rear surface of the first positive lens in said rear sub-group; r10 is the radius of curvature of the rear surface of the second positive lens in said rear sub-group; and r11 is the radius of curvature of the front surface of the negative lens in said rear sub-group.

2. A zoom lens according to claim 1, wherein said variator consists of a negative lens and a negative cemented lens made of negative and positive lenses, said compensator consists of a negative cemented lens made of negative and positive lenses, and said converter consists of a plurality of positive lenses.

* * * * *